Oct. 27, 1931.  F. C. MORRIS  1,829,530
STEERING COLUMN BUSHING
Filed April 22, 1929
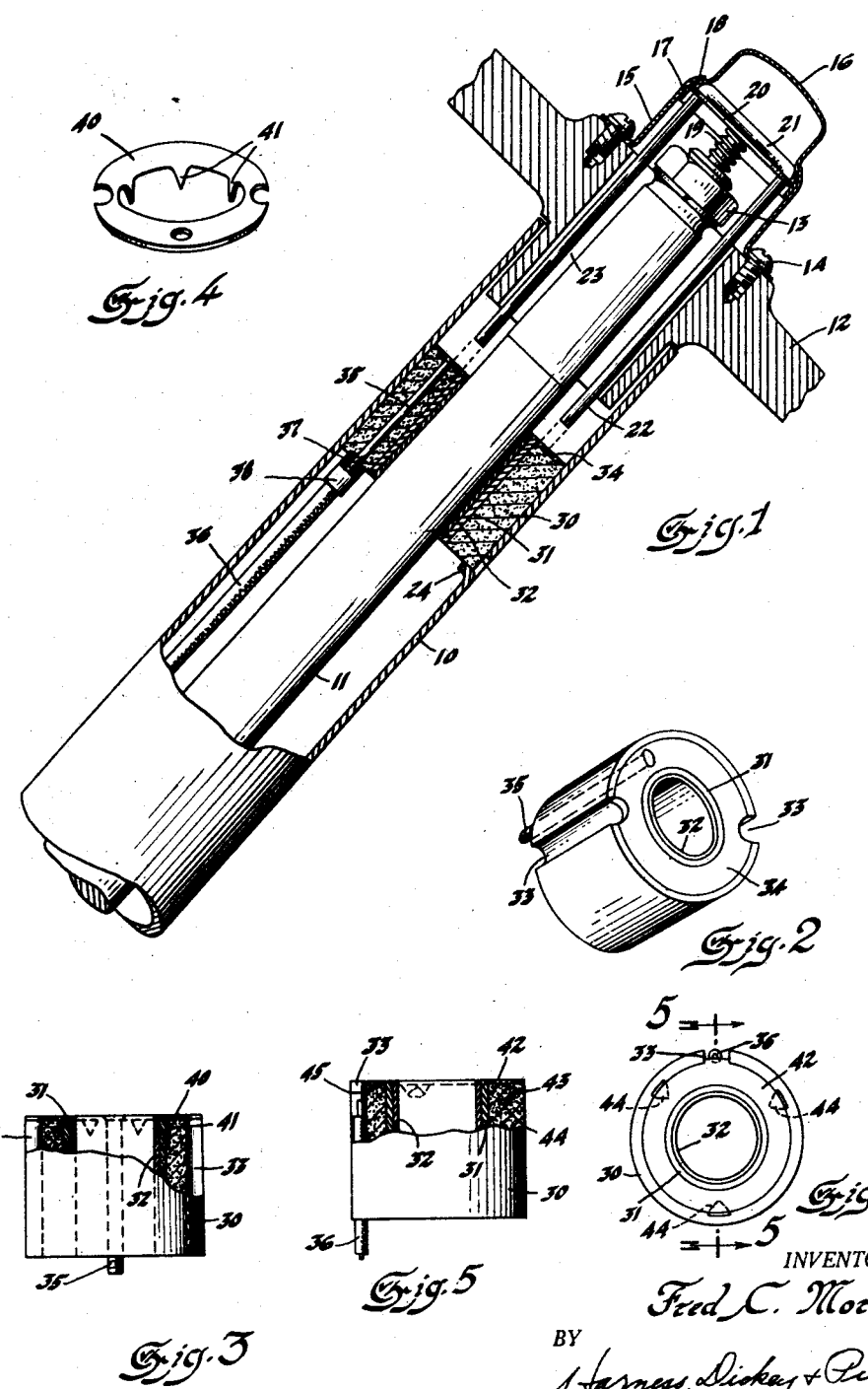
INVENTOR.
Fred C. Morris
BY
Harness, Dickey & Pierce
ATTORNEYS Patented Oct. 27, 1931

1,829,530

UNITED STATES PATENT OFFICE

FRED C. MORRIS, OF SAN FRANCISCO, CALIFORNIA

STEERING COLUMN BUSHING  REISSUED

Application filed April 22, 1929. Serial No. 357,156.

This invention relates to steering columns for motor vehicles, and particularly to bushings for such steering columns in which a particular type of horn push button is incorporated necessitating the insulated passage of an electrical current through the bushing, the principal object being the provision of a new and novel bushing for such steering columns.

Another object is to provide a steering column bushing formed of moldable material and having secured to one end thereof a contact plate.

Another object is to provide a steering column bushing of moldable material having a contact plate secured to one end thereof in a manner to prevent shifting of the plate and to amply insulate it from possible short circuiting with the steering column or mast jacket of an automobile steering column in which it is to be used.

Another object is to provide a steering column bushing of moldable material having a metallic contact plate secured to one end thereof and provided with a conductor extending through the bushing.

A further object is to provide a steering column bushing formed of moldable material and having a metallic contact plate vulcanized to one end thereof.

The above being among the objects of the present invention, the same consists in certain novel features of construction and combinations of parts to be hereinafter described with reference to the accompanying drawings, and then claimed, having the above and other objects in view.

In the accompanying drawings which show a suitable embodiment of the present invention, and in which like numerals refer to like parts throughout the several different views:

Fig. 1 is a fragmentary partially broken view of the upper end of a motor car steering post showing a suitable embodiment of the present invention in connection therewith.

Fig. 2 is a perspective view of the bushing shown in Fig. 1.

Fig. 3 is a partially broken side elevation of a slightly modified form of bushing.

Fig. 4 is a perspective view of the contact plate employed in connection with the bushing shown in Fig. 3.

Fig. 5 is a partially broken side elevation of another modified form of bushing taken as on the line 5—5 of Fig. 6.

Fig. 6 is a plan view of the bushing shown in Fig. 5.

The present invention relates to a steering column bushing designed particularly for use in connection with a widely used form of horn push button construction, and in which the steering column bushing is provided with a contact plate on its upper surface insulated from the metallic parts of the steering post and connected by a wire extending down through the upper end of the steering post to a suitable source of electrical current.

Heretofore, as far as I am aware, the bushings employed in connection with such horn push buttons have been made of wood and provided with a contact plate secured thereto by crimping, and inasmuch as such bushings are liable to be affected by the weather, their fit on the shaft varies accordingly, and the contact plates secured to them have shown the tendency to work loose and to cause short circuiting. Furthermore, the bushings have had a tendency, in some cases, to sieze to the shaft and thereafter turn in the mast jacket, often causing breakage of the conductor wire leading from their contact plates. Accordingly, I have provided in the present invention, a construction which eliminates all of the disadvantages which heretofore have been present in connection with the bushings conventionally employed with this type of horn push button.

Referring to Fig. 1 in which a steering post employing the type of horn push button herein referred to is shown, 10 indicates the mast jacket in which the steering post 11 is rotatably received. A steering wheel 12 is non-rotatably secured to the upper end of the post 11 by means of a nut 13. Secured to the upper face of the wheel 12 by means of screws such as 14 is a sleeve member 15 in which a button member 16 is slidably received, the lower edge of the button being outwardly flared as at 17 and the outer edge of the sleeve 15 being inwardly flared as at 18 to limit the outward movement of the button 16 which is constantly urged outwardly by means of a coil spring 19 held under compression between the upper end of the post 11 and the disc 20 received in the enlarged end of the button 16. A U-shaped extending wire member 21 is clamped between the plate 20 and the reduced portion of the button 16, and its legs 22 extend axially of the post 11 through grooves 23 formed in the bore of the wheel 12 and project to a point below the lower edge of the hub of the wheel 12 which is rotatably received in the upper end of the mast jacket 10. The bushing comprising the present invention is positioned immediately below the lower ends of the legs 22 of the U-shaped member 21 between the mast jacket 10 and the post 11, the mast jacket 10 having one or more inwardly struck portions such as 24 acting to limit the axial position of the bushing relative to the jacket.

In accordance with the present invention, the bushing illustrated as the preferred form is comprised of an outer sleeve 30 of soft rubber and an encircled sleeve 31 of hard rubber which, in turn, is provided with a liner 32 of fabric which may or may not be impregnated with graphite or other dry lubricant. The bushing is so formed that the liner 32 forms a bearing sleeve for the post 11 and is maintained in proper shape by the hard rubber bushing 31. The original or free diameter of the soft rubber portion 30 is greater than the internal diameter of the mast jacket 10 so that the soft rubber must be compressed when it is inserted into the jacket 10. The friction thus set up between the soft rubber 30 and the jacket 10 is great enough to effectively prevent any possible relative rotation of the bushing and the jacket. It is, of course, understood that the soft rubber is vulcanized to the hard rubber sleeve 31 which in turn is vulcanized to the liner 32, and that the hard rubber liner 31 is sufficiently rigid to withstand the compressing action to which it is subjected upon compression of the soft rubber 30. The compression of the soft rubber 30 may be aided by axially grooving the exterior surface thereof as at 33, which thus permits the rubber to be displaced into the grooves 33 upon radial compression.

In accordance with the construction shown in Figs. 1 and 2, a metallic contact plate 34 is vulcanized to the upper end of the bushing. This plate 34 is preferably centered by, and spaced from possible contact with the post 11, by the hard rubber portion 31, and is of substantially smaller diameter than the internal diameter of the jacket 10 so as to prevent any possible contact with the jacket 10. A screw member 35 extends from the contact plate 34 down through the bushing, as best indicated in Fig. 1, and an insulated electric wire or cable 36 having a screw threaded terminal connection 37 guarded by the insulating sleeve 38 is connected to the screw 35 by threading the end connection 37 on to its projecting end.

It will be apparent that the construction of this bushing is such that it is not affected by weather conditions, and that it may firmly fit mast jackets varying considerably in internal diameter and still be retained against possible rotation in respect to them. It will be further evident that the contact plate 34 in being vulcanized to the rubber, will securely retain its position which is further insured by the screw 35 being drawn down in place by the connector member 37.

The operation of the horn itself is as follows: The wire 36 is usually connected to the positive or live side of the battery and the post 11 and jacket 10 are usually connected, as by a ground connection, to the negative side of the battery. The horn is usually connected in the positive line 36. The U-shaped member 21 is in direct metallic contact with the post 11 and when the button 16 is depressed far enough to move the lower ends of the legs 22 into contact with the plate 34 the circuit is closed so as to cause operation of the horn.

The plate 34 may be secured to the bushing in a number of various ways. It may be formed as indicated in Fig. 4, in which it is shown as a metallic ring 40, with a plurality of axially extending prongs 41 at its inner edge, the prongs 41 preferably being so located as to be positioned between the hard rubber and soft rubber portions of the bushing, and thereby not only aiding in maintaining the centralization of the contact plate, but also where vulcanized in place, aiding in providing a greater area of vulcanized surface. The bond between the contact ring and the bushing material may be further increased without depending upon the vulcanization feature, by employing a contact plate such as 42 shown in Figs. 5 and 6. In this case, the contact ring 42 is provided at its outer edge with a plurality of axially extending prongs or fingers 42 whose ends are inwardly bent as at 44 to form an anchorage means for the plate 42. A variation of the method of connecting the wire 36 is shown in this case and which comprises the provision of a tongue such as 45 bent into one of the grooves 33 and to which the end of the cable 36 is directly soldered or otherwise secured, the cable 36 in such case extending down through the groove 33 in its passage to the lower end of the bushing.

Formal changes may be made in the specific embodiment of the invention described without departing from the spirit or substance of the broad invention, the scope of which is commensurate with the appended claims.

What I claim is:

1. In combination, a steering column bushing formed of moldable material, and a metallic contact member inserted in one end of said bushing in flush relation with said end.

2. In combination, a steering column bushing formed of moldable material, and a metallic contact member vulcanized to one end thereof in flush relation with said end.

3. In combination, a steering column bushing formed of moldable material, and a metallic ring of lesser internal and external diameter than said bushing inserted in one end of said bushing in concentric and flush relation therewith.

4. In combination, a bushing comprising a rigid shape maintaining shell, a cooperating shell of yieldable material, and a metallic contact ring secured to one end of said bushing and maintained in concentric relationship therewith by said rigid shell.

5. In combination, a bushing formed of cooperating hard and soft rubber shells, and a metallic contact ring secured to one end thereof.

6. In combination, a bushing comprising a hard rubber shell provided with a fabric liner and a soft rubber covering, and a metallic contact plate secured to one end of said bushing, said plate being provided with prongs imbedded in said bushing between said hard and soft rubber shells.

7. In combination, a steering column bushing formed of dielectric material having a contact member formed of electrically conductive material secured thereto, the external surface of said contact member being flush with the external surface of said bushing.

8. In combination, a steering column bushing formed of dielectric material having a contact member formed of electrically conductive material secured thereto by integral prongs extending into said bushing, the external surface of said contact member being flush with the external surface of said bushing.

9. A bushing comprising an inner shell of fabric surrounded by a shell of hard rubber enclosed in a soft rubber case, said soft case having an annular groove in one end thereof, an annular contact member in said groove secured to said soft case and guided by said hard rubber shell.

10. A bushing comprising a fibrous bearing portion, a rigid shape maintaining portion of non-metallic moldable material, and a resilient cushioning portion, a contact member secured to said resilient portion and guided by said shape maintaining portion.

FRED C. MORRIS.